Aug. 7, 1956  A. J. FITZGERALD  2,757,765
LOCOMOTIVE GRILLE
Filed March 28, 1952  3 Sheets-Sheet 1
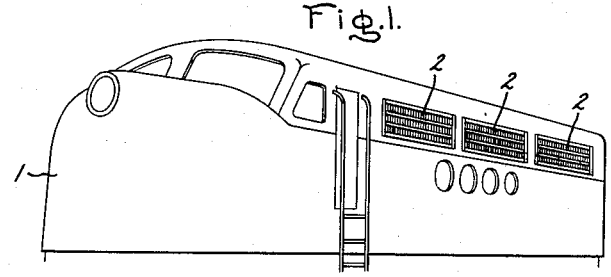
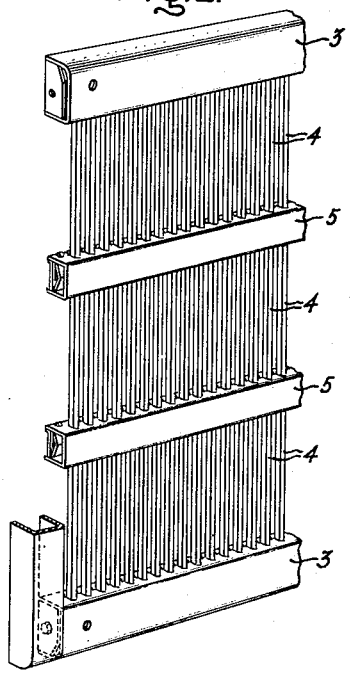
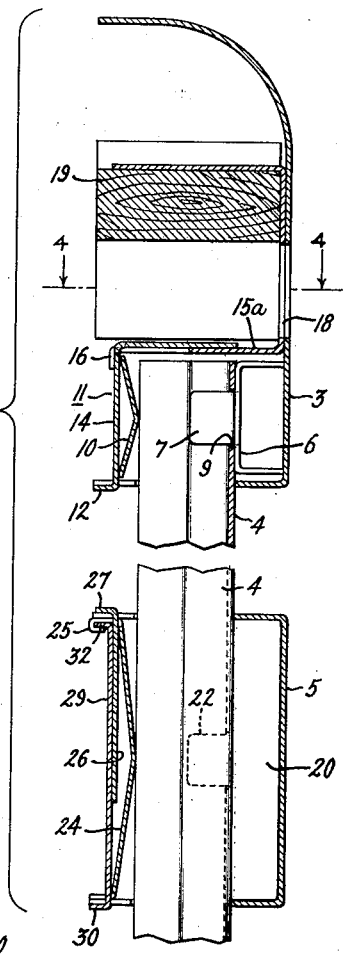
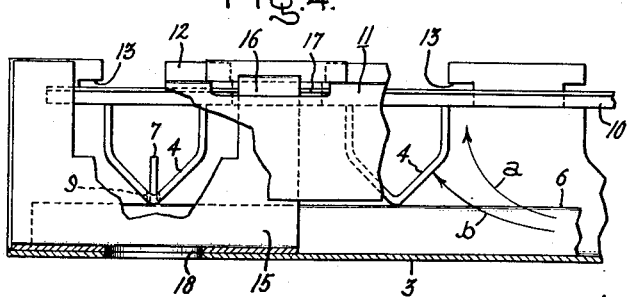
Inventor
Albert J. Fitzgerald,
by Merton D. Moore
His Attorney.

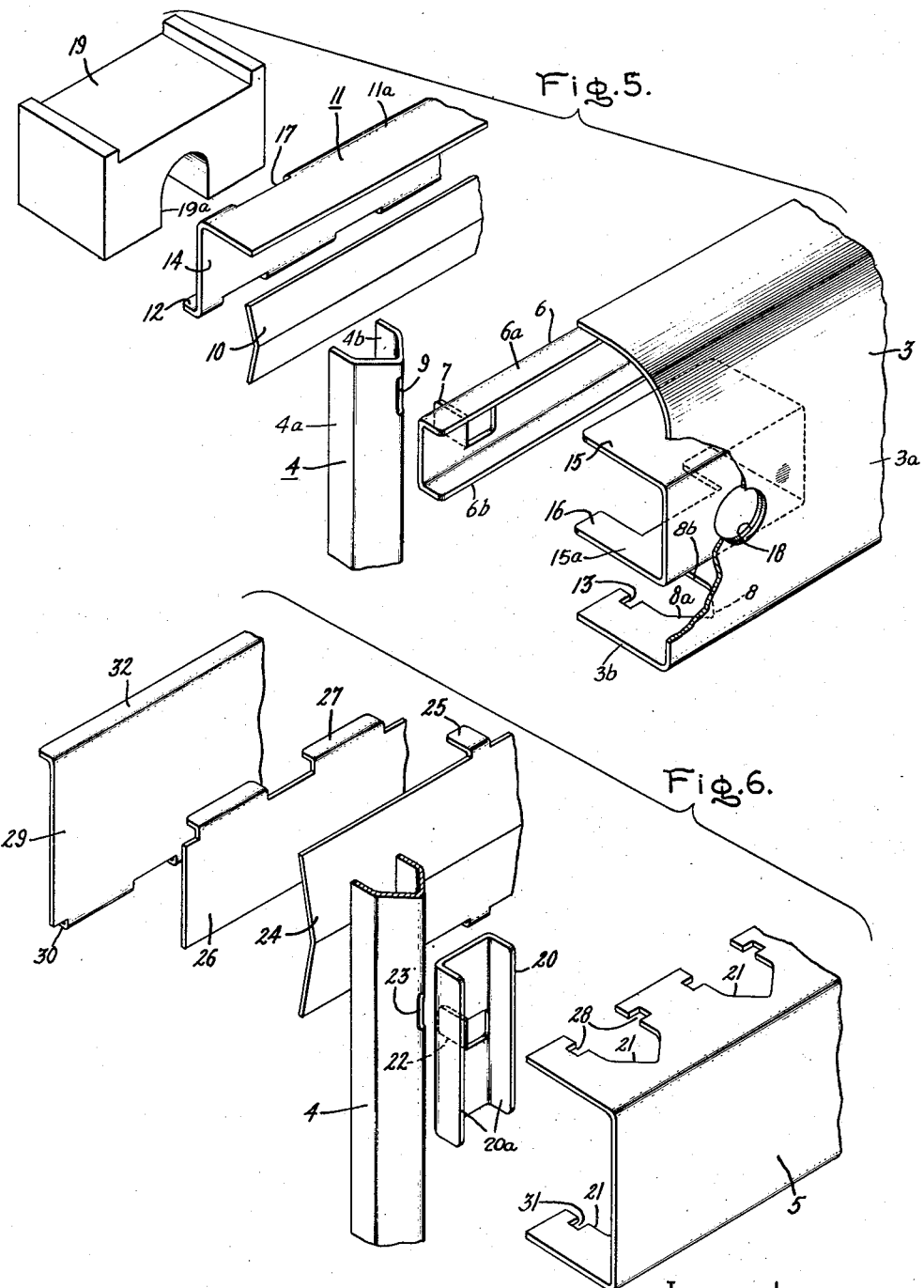

Aug. 7, 1956  A. J. FITZGERALD  2,757,765
LOCOMOTIVE GRILLE
Filed March 28, 1952  3 Sheets-Sheet 3
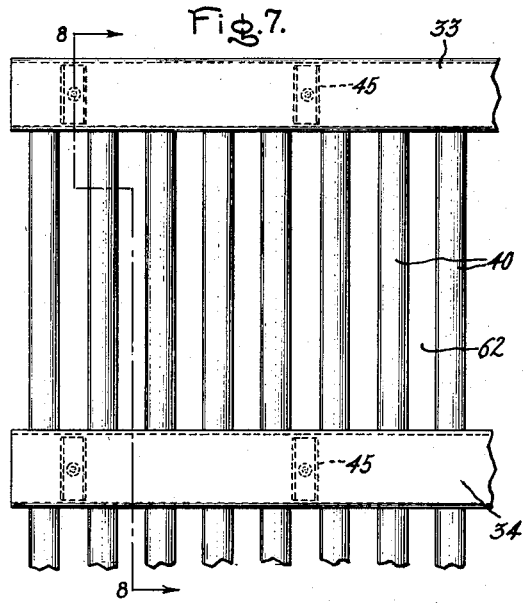
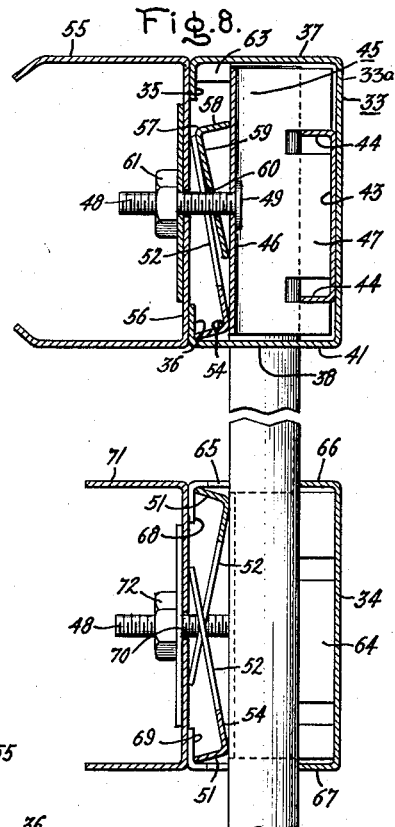
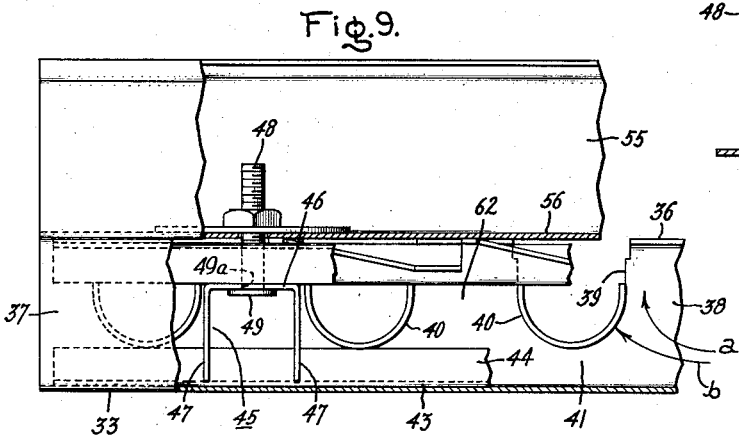
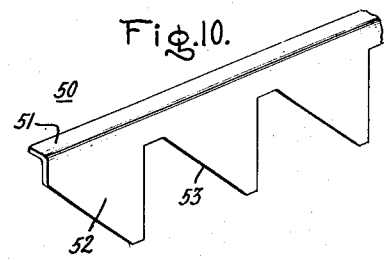
Inventor:
Albert J. Fitzgerald,
by Merton D. More
His Attorney.

United States Patent Office 2,757,765
Patented Aug. 7, 1956

2,757,765

LOCOMOTIVE GRILLE

Albert J. Fitzgerald, Syracuse, N. Y., assignor to General Electric Company, a corporation of New York Application March 28, 1952, Serial No. 279,189

7 Claims. (Cl. 189—82)

This invention relates to grille structures, and, in particular, to an improved grille structure fabricated from a plurality of individual structural members.

Grille structures, of the type to which my invention relates, may be employed, for example, in a wall of a locomotive cab to provide for the passage of air into the locomotive equipment. Certain purposes of such a grille are to conduct cooling air into the locomotive and to separate dust from the cooling air. Such grilles in accord with my invention add to the eye appeal of the locomotive, and accordingly are usually made to have a highly polished surface.

In assembling a highly polished structure, made for example from chrome plate stock, two basic approaches may be followed: one, the parts may be welded together and then plated and polished; or two, the individual members may be plated and polished before assembly.

The assembly before plating produces a high cost grille since it is difficult to get into the interstices of a preassembled grille to polish the metal after it has been plated. With the second approach, however, a less expensive grille is produced since it is much simpler to plate and polish individual members rather than in assembled structure.

With prefinished parts, however, it should be noted that a mechanical fabrication is required and the parts cannot be welded together, since the welding heat will tarnish the surface and consequently destroy the high polish.

It is an object of this invention, therefore, to provide an improved grille, adapted for use such as that mentioned, which may be mechanically assembled from prefinished parts.

It is a further object of this invention to provide an improved locomotive grille made from prefinished members wherein the contour of the prefinished members is such as to deflect dust to cause the grille to be a dust-separating screen.

It is a still further object of this invention to provide an improved prefinished grille structure which is vibration resistant.

It is a still further object of this invention to provide an improved prefinished grille wherein the parts are held together by mechanical assembly.

A grille structure in accordance with the present invention comprises at least one longitudinal member and a plurality of transverse members which are positioned along the longitudinal member. The longitudinal member includes a face portion and stop means provided for limiting movement of the transverse members toward the face portion. A resilient strip of non-planar cross section is disposed parallel to and opposite the face portion and engages each of the transverse members. The structure further includes a retaining member secured to the longitudinal member and in engagement with the resilient strip, the distance between the retaining member and the transverse members being smaller than that between an unstressed position of the strip and the transverse members so that each transverse member is biased into engagement with the stop means.

Further objects and advantages of this invention will become apparent and the invention will be more clearly understood from the following description referring to the accompanying drawing and the features of novelty which characterize this invention will be pointed out with particularity in the claims annexed to and forming a part of this specification.

Referring to the drawings, Fig. 1 is a perspective view of a locomotive cab showing a number of grilles in one side thereof. Fig. 2 is a perspective view of a portion of one of the grilles of a locomotive cab; Fig. 3 is a side elevation partly in section of a portion of the grille shown in Fig. 2, drawn to an enlarged scale; Fig. 4 is a top view taken through the plane 4—4 of Fig. 3 in the direction of the arrows; Fig. 5 is an exploded view of the upper portion of the grille shown in Fig. 2 showing the interlocking of the longitudinal and transverse members; Fig. 6 is an exploded view of the interlocking of one of the intermediate longitudinal members with the transverse members; Fig. 7 is a front elevation of a second embodiment of my invention; Fig. 8 is a side elevation taken through the plane 8—8 in the direction of the arrows, drawn to an enlarged scale; Fig. 9 is a top view, partially cut away, of that grille shown in Fig. 7; while Fig. 10 is a perspective view of a portion of one of the tension members used in the assembled grille shown in Figs. 7–9.

In Fig. 1 of the drawings, there is shown a locomotive cab 1 provided with a plurality of grille-receiving openings in its upper side walls. A plurality of grilles 2 are positioned in corresponding openings. Each grille 2 comprises a plurality of longitudinal members 3, as shown in Fig. 2, joined by transverse members 4. Longitudinal bracing members 5 are used as stiffening agents to prevent vibration in the transverse members 4.

To improve the appearance of the grille, the longitudinal members 3, the transverse member 4, and the bracing members 5 are made of some metal such as brass or cold rolled steel having a highly polished chromium finish.

Figs. 3 and 4 illustrate the inter-relationship between the transverse member 4 and the longitudinal members 3 and between the transverse members 4 and the bracing members 5. These details may best be understood by first examining Figs. 5 and 6 which are exploded views showing the respective inter-relationships.

The transverse strips 4 preferably are formed to have a cross section of a somewhat V-shape to provide rigidity while the longitudinal members 3 are formed to have an essentially U-shaped cross section thereby presenting smooth rounded contours to effect a pleasing eye appeal to the grille structure.

A receiving member 6 of U-shaped, channel configuration is disposed coaxially, in parallel relation within the longitudinal member 3. As shown in Fig. 5, the leg portions 6a and 6b of member 6 engage the inner surface of the web portion 3a of member 3. Channel member 6 has a plurality of lanced-out tongues 7, which are received by cooperating longitudinal slots 9 in transverse members 4. The tongues 7 are spaced apart along member 6 so that each is oriented with location of one of the transverse members 4.

Receiving member 6 is disposed relative to the longitudinal member 3 in such a way that the plane of each tongue 7 substantially bisects an individual one of a plurality of V-shaped notches 8 cut in the bottom leg 3b of the longitudinal member 3. Thus, each transverse member 4 may be inserted into one of the notches while tongue 7 is received by aperture 9. Thereafter, tongue 7 may be bent or otherwise deformed to hold the transverse member 4 in assembled relationship with the U-shaped receiving member 6.

In order to hold the transverse members 4 and the receiving member 6 in assembled relationship with the longitudinal member 3, a V-shaped resilient strip 10 is disposed parallel to member 6 and engages the extremities of the legs 4a and 4b of transverse members 4 to bias these members against the front ends 8a and 8b of the respective notches 8 in longitudinal member 3. A retaining member 11 of angle or Z-shaped cross section engages the resilient strip 10 and interlocks with those pieces of the grille already described to effect a tight mechanical relationship.

This is accomplished by foot-like portions 12 of angle-shaped member 11 which are received by slots 13. Each of these slots is composed of a pair of narrow notches which extend laterally from the sides of one of the notches 8. The foot-portions 12, in being assembled in slots 13, are used as a pivot point to allow the angle-shaped member 11 to be rotated about the intersection of the foot portions 12 and slots 13 so that the body or connecting portion 14 of the angle member 11 engages the resilient strip 10 and a bias is maintained on the assembled structure thus far described.

In order to hold the angle member 11 in assembled relationship with a longitudinal member 3, a locking element 15 is screwed or otherwise secured to the longitudinal member 3 in interfitting relation therewith, above the location of member 6 as shown in Fig. 3. The lower leg portion 15a of member 15 is provided with tongues 16 which are adapted to pass through corresponding slots or apertures 17 disposed at the junction of body portion 14 and the upper leg 11a of the angle-shaped member 11. Accordingly, when in the assembly process the angle-shaped member 11 is rotated about the points of contact of the foot portions 12 with the peripheries of slots 13, tongue 16 passes through aperture 17 as shown in Fig. 4. Thereafter, the tongue is bent downwardly, or otherwise deformed, as illustrated in Fig. 3, to hold the locking element 15 and the angle member 11 in assembled relationship.

To secure the locking element 15 to the longitudinal member 3, a screw (not shown), or the equivalent, is received by an opening 18 in the face portion of member 3, an aligned opening in the bight portion of channel member 15, an aligned opening 19a in a supporting wooden block 19 and preferably engages a threaded opening not shown in a portion of the locomotive cab. With this structure it is not necessary to secure locking element 15 directly to longitudinal member 3 since the block 19 holds the element against the longitudinal member 3.

The inter-relationship between the bracing member 5 and the transverse members 4 is somewhat similar to that between the longitudinal members 3 and the transverse members. In this structure, however, a number of U-shaped stop members 20 are disposed parallel to transverse members 4. The legs 20a of stop members 20 engage the inner surface of the web portion of the bracing member 5 and the base portion of each of the stop members is longitudinally aligned with a plane intercepting the apices of a pair of V-shaped, aligned notches 21 formed in both legs of bracing member 5. The length of the legs of the stop members 20 are such that each stop member engages both the bracing member 5 and the associated one of transverse members 4. In this embodiment, tongues 22 are lanced from the web portions of stop members 20. Each tongue is received by a longitudinal slot 23 in the respective transverse member 4. Accordingly, when a transverse member 4 is superimposed upon a stop member 20, the tongue 22 can be twisted or otherwise deformed to lock transverse member 4 to the stop member 20.

It has been found unnecessary to have a U-shaped member 20 for every transverse member 4. Instead the number is chosen in accordance with the requirements imposed by the intended application of the grille. In a particular example embodying the invention, it has been found that one stop member 20 with its tongue 22 should be used for approximately every fifth transverse member.

A resilient strip 24 extends parallel to member 5 and engages the open ends of each of the transverse members 4. To maintain a spring bias on this assembly, first backing strip 26 engages resilient strip 24. Strip 26 has a plurality of spaced ears 27 which extend transversely from its upper edge. Each ear is received by one of slots 28 which extend laterally from the peripheries of notches 21. Strip 24 is provided with a plurality of transverse tongues 25, each of which is arranged to lie between a pair of the ears 27.

With this structure, the ears 27 of backing strip 26 may be pivoted in slots 28, and accordingly the backing strip may be rotated about this junction. In order to hold the backing strip 26 in place after it is rotated to the position shown in Fig. 3, a second backing strip 29 is employed. This latter backing strip similarly has ears 30 each of which is received by one of a plurality of slots 31 that extend laterally from the peripheries of lower notches 21. This permits the backing strip 29 to be rotated so that the backing strip 29 may be positioned in engagement with the backing strip 26, as shown in Fig. 3. The ears 25 which extend from the resilient strip 24 may then be bent over a lip 32 of the backing strip 29 to maintain all the elements in assembled relationship, thereby to provide a rigid and secure interlocking structure.

In the embodiment shown in Figs. 7 through 10, the longitudinal members 33 and the bracing members 34 are somewhat akin to the longitudinal members 3 and bracing members 5 respectively, but both longitudinal members 33 and bracing member 34, in addition to having a U-shaped cross section, have a bent-in lip at the end of each leg of the U; for example, longitudinal member 33 shown in Fig. 8 is of U-shape and has bent-in lips 35, 36 at the extremities of legs 37, 38. Lip 35 and the upper leg 37 of longitudinal member 33 are uninterrupted and therefore provide a top decorative surface for the grille.

The lower leg 38, however, has notches or openings such as shown in Fig. 9, cut therein to accommodate the transverse members 40. Accordingly, transverse member 40 may be inserted in aperture 39 and placed into engagement with the upper leg 37 of longitudinal member 33. Notch 39 is so constructed that a portion 41 of leg 38 acts as a stop to limit the positioning of transverse member 40.

In order to brace the upper or free end of transverse member 40, to prevent wobbling relative to the longitudinal member 33, a brace member 43 is disposed in parallel, interfitting relation with member 33. It is provided with legs 44 which extend a distance equal to the length of portion 41 whereby transverse member 40 engages portion 41 as well as the legs 44 of brace member 43.

A plurality of boxlike elements 45, each having a base 46 and a pair of perpendicular legs 47 extending therefrom, are spaced along the longitudinal member 33 and bracing members 34 so that the legs 47 rest against the brace member 43. Base 46 has an aperture 49a therein for accommodating a bolt 48 which has a head 49 welded to the base 46. The notches in leg members 47 permit brace member 43 to extend therethrough.

In order to lock the transverse members 40 to the longitudinal members 33, the bases 46 of the box members 45 are resiliently connected with the base of the longitudinal member 33. This is accomplished by providing a resilient element, shown in Fig. 10, which has an L-shaped cross section. This element is disposed with the extremity of its short leg 51 in engagement with the lip 36 of longitudinal member 33, and with the junction 54 of the short and long legs bearing against the base 46 of the boxlike member 45. The long, leaflike legs 52 define notches 53 which are employed for a purpose hereinafter described.

In the assembly process, the free legs 52 of the member 50 extend behind a plane through the lips 35 and 36 of longitudinal member 33, and a backing member 55 is forced against legs 52 and is attached to the grille. Thus, as shown in Fig. 8, the base 56 of the backing member bears against the long legs 52 and a pressure is exerted which biases juncture 54 against the base 46 of boxlike member 45.

To assist in holding the boxlike member 45 in engagement with the longitudinal member 33, a second angle piece 57 having a short leg 58 and a long leg 59 is disposed in inverted relation with respect to L-shaped member 50. The extremity of the short leg 58 bears against the base 46 at a point approximately behind the upper one of legs 44 of brace member 43. Angle member 57 is in the form of a strip and it contains a plurality of openings 60 through which the bolts 48 may pass.

With this assembly, juncture 54 of the angle member 50 and the legs of member 57 are in engagement with the base 46 of boxlike member 45. Moreover, the base 56 of backing member 55 engages the free end of legs 52 of L-shaped member 50 and engages the lips 35 and 36 of the longitudinal member 33. Thus, a nut 61 associated with screw 48 may be tightened to draw the base 46 toward the plane of lips 35 and 36 of the longitudinal member 33.

The tension put on bolt 48 by nut 61 is transmitted to the short legs 51 and 58 of the members 50 and 57, respectively. This tension, in turn, is exerted between the base 56 of member 55 and the points of contact of the juncture 54 and the extremity of leg 58 with the transverse members 40. Accordingly, the transverse members 40 are biased into engagement with the longitudinal members 33. (See Fig. 9.)

Each of the boxlike members 45 may optionally be provided with a lip 63 which has such a length that it lies behind the lip 35 of the longitudinal member 33. In this way, bracing member 43 is maintained in engagement with the longitudinal member 33. In other words, one end of the boxlike member 45 is locked between the bracing member 43 and the lip 35.

The interconnection between the bracing member 34 and the transverse members 40 is somewhat akin to the relationship between the longitudinal member 33 and the transverse members 40. However, the bracing member 34 is provided with a notch 65 in each of its upper and lower legs 66, 67. This is required since the transverse member extends completely through the bracing member 34 rather than terminating within it, as described for the relationship with longitudinal member 33.

The outer ends of legs 66 and 67 of bracing member 34 are provided with bent-in lips 68 and 69, respectively. These lips are so constructed that they are composed of a number of short lengths spaced apart by the width of notches 65 so that the transverse members 40 can be fitting into all of the notches 65 directly from the rear of member 64 which is substantially identical to box-like members 45 of the upper portion of Fig. 8. Thus, there is no need to slide the transverse members 40 transversely through the sides 66 and 67.

With the bracing member 34, it is not necessary to use a member such as the member 43 shown in Fig. 8 since each of the transverse members 40 bears against the peripheries of a pair of notches 65 in the legs 66 and 67.

To hold the transverse members 40 in engagement with the bracing member 34, a pair of L-shaped, resilient members 50 are used, as shown in the lower half of Fig. 8. The short leg 51 of each of the members 50 is in engagement with one of the lips 68, 69, respectively, and the juncture 54 of each of the members 50 engages the transverse members 40. Thus, the transverse members are maintained in engagement with the bracing member 34.

In the assembly process, the extremities of the longer legs 52 of the members 50 extend behind the plane of the lips 68, 69 and they are displaced to the positions shown by bringing a backing member 71 into engagement with lips 68 and 69. Backing member 71 cooperates with a number of the boxlike members 64 similar to box-like members 45 having bolts 48 which extend therefrom and which are received by apertures in the backing member. A nut 72 is tightened onto bolt 48, thereby biasing the points 54 against the transverse members 40.

The L-shaped members 50 are so constructed that their notches 53 permit the interleaving of the legs 52 so that one leg 52 of one member passes through one notch 53 of the other member. Accordingly, in the assembling operation, when the member 71 is moved toward the transverse member 40, there is no binding between the two angle members.

One of the primary features of this construction is that there is a resilient interrelation provided between the transverse members 40 and both the longitudinal member 33 and the bracing member 34. This is advantageous since vibration is absorbed through the resilient interrelation. If either a loose or a rigid structure were used, vibration and/or rattling may be produced and thus create an annoying noise.

As shown in Figs. 4 and 9, the transverse members 4 and 40, respectively, are shaped so that they may function to separate dirt from the air drawn into the locomotive. This separation occurs since the air has to make a turn to pass through the apertures defined by contiguous transverse members, as shown by arrow $a$. In so turning, the dirt in the air having a higher mass tends not to make the turn through the apertures and instead it follows a path such as illustrated by arrow $b$ and strikes the surface of the next transverse member. Thus, undesirable dirt particles are deflected by the transverse members and are thrown away from the locomotive grille. It is obvious, therefore, that this new grille not only has a decorative value, but also operates as an effective dirt or dust separator and clean cooling air alone enters the locomotive.

Although in the illustrated embodiments of the invention, the transverse members (members 4 of Fig. 2 and members 40 of Fig. 7) have been shown as being disposed essentially perpendicular to the longitudinal members (members 3 and 5 of Fig. 2 and members 33 and 34 of Fig. 7), various other angular relationships may obviously be employed. For example, with reference to Figs. 7-9, members 40 may be inclined at an angle of forty-five degrees with respect to longitudinal members 33 and 34. In that case, openings 65 in legs 66 and 67 must be suitably offset so as to be aligned to receive transverse members which are so oriented. Thus, the term "transverse member" as used herein is intended to denote a member which is disposed at any of a variety of angles relative to a longitudinal member.

While this invention has been discussed with relation to the primary embodiments, it is to be noted that modifications of this invention will occur to those skilled in the art and it is desired to be understood, therefore, that this invention is not to be limited to the particular embodiments disclosed but rather it is intended to cover all modifications which are within the true spirit and scope of this invention.

What I claim as new and desire to secure by Letters Patent of the United States is:

1. A grille comprising longitudinal channel members having flanges rearwardly disposed thereon, said longitudinal members being disposed in parallel pairs, the inner-flanges being provided with aligned spaced notches, a plurality of transverse members, said longitudinal members receiving said transverse members in said notches, a plurality of receiving members, each receiving member disposed in a respective channel member against the inner-web surface of the respective channel member and having an outer surface of said receiving member in alignment with the base of said notches, said transverse members received in said notches and abutting said receiving members, said transverse members and said receiving members having cooperating tongues and slots, whereby said transverse members are secured to said receiving members when said tongues are bent after having been passed through said slots, a resilient member abutting the opposite side of said transverse members in each of said longitudinal channel members, and means having flanges for exerting pressure on each of said resilient members to urge said transverse members into contact with said receiving members, one of said flanges interlocking with said notches, and the other of said flanges being secured to said longitudinal members.

2. A grille comprising longitudinal channel members having flanges rearwardly disposed thereon, said longitudinal members being disposed in parallel pairs, the inner-flanges being provided with aligned spaced notches, said notches having slotted-wall portions therein, a plurality of transverse members, said longitudinal members receiving said transverse members in said notches, a plurality of receiving members, each receiving member disposed in a respective channel member against the inner-web surface of the respective channel member and having an outer surface of said receiving member in alignment with the base of said notches, said transverse members received in said notches and abutting said receiving members, said transverse members and said receiving members having cooperating tongues and slots, whereby said transverse members are secured to said receiving members when said tongues are bent after having been passed through said slots, a resilient member abutting the opposite side of said transverse members in each of said longitudinal channel members, and means having flanges for exerting pressure on each of said resilient members to urge said transverse members into contact with said receiving members, one of said flanges interlocking with the slotted-wall portions of said notches, and the other of said flanges secured to said longitudinal members.

3. A grille comprising longitudinal channel members having flanges rearwardly disposed thereon, said longitudinal members being disposed in parallel pairs, the inner flanges being provided with aligned spaced notches, at least one bracing channel member having rearwardly extending flanges thereon disposed between each pair of said longitudinal channel members and being parallel therewith, each of said bracing channel members having aligned spaced notches in the flanges thereof, said notches being in alignment with the notches in said longitudinal channel members, a plurality of transverse members, said channel members receiving said transverse members in said aligned notches, a plurality of receiving members, each receiving member disposed in a respective channel member against the inner-web surface of the respective channel member and having an outer surface of said receiving member in alignment with the base of said notches, said transverse members received in said notches and abutting said receiving members, said transverse members and said receiving members having cooperating tongues and slots, whereby said transverse members are secured to said receiving members when said tongues are bent after having been passed through said slots, a resilient member abutting the opposite side of said transverse members in each of said channel members, and means having flanges for exerting pressure on each of said resilient members to urge said transverse members into contact with said receiving members, one of said flanges interlocking with said notches, and the other of said flanges being secured to said channel member.

4. A grille structure comprising a longitudinal member having a U-shaped cross-sectional configuration, the bottom of said U comprising the base portion of said longitudinal member and the legs of said U being rearwardly disposed, a plurality of openings distributed along each leg portion of said longitudinal member, said openings being disposed in transverse alignment, a corresponding plurality of transverse members having front and back portions thereon, each of said transverse members being disposed in the aligned openings in said longitudinal member with the front portions thereof facing the base portion of said longitudinal member, a resilient strip of non-planar cross-section disposed within said longitudinal member behind the back portions of said transverse members, said resilient strip having a portion abutting the back portions of said transverse members, and a retaining member secured to said longitudinal member and disposed behind and abutting another portion on said resilient strip, whereby said transverse members are biased in said openings toward the base portion of said longitudinal member.

5. A grille comprising a longitudinal channel member having flanges rearwardly disposed thereon with respect to the base thereof, the flanges being provided with a plurality of aligned spaced openings, a stop element having front and rear portions thereon disposed in said longitudinal channel member, the front portion of said stop element abutting the base of said longitudinal channel member and the rear portion thereof being tangent to the inner edge of said openings, a plurality of transverse members received by said aligned openings and extending rearwardly therein, a resilient strip of non-planar cross-section disposed behind said transverse members in said longitudinal channel member, one side of said resilient strip having a portion abutting said transverse member, and a retaining member secured to said longitudinal channel member on the other side of said resilient strip and abutting said resilient strip, whereby said transverse members are biased toward the line of tangency of said stop element and the inner edge of said openings.

6. A grille structure comprising a longitudinal channel member having flanges rearwardly disposed thereon with respect to the base portion thereof, the flanges being provided with aligned spaced notches, a plurality of transverse members, said longitudinal channel member receiving said transverse members in said aligned spaced notches, at least one box-like member having a base and leg portions perpendicular thereto disposed in said longitudinal channel member between a pair of said aligned spaced notches, the leg portions of said box-like member extending toward the base portion of said longitudinal channel member, a pair of resilient elements of L-shaped cross-section, each including one leg having a plurality of spaced fingers defining a plurality of openings and each of said resilient elements being disposed in said longitudinal channel member behind said transverse members and said box-like member with the juncture of the legs thereof in engagement with said transverse members and said box-like member and said fingers of one of said resilient elements extending in interweaving relation with the fingers of the other of said resilient members, and means secured to said longitudinal channel member for engaging the legs of said resilient members, whereby said transverse members are urged into engagement with said aligned spaced notches, and the perpendicular legs of said box-like members are urged into contact with the base portion of said longitudinal channel member.

7. A grille comprising a longitudinal channel member having flanges rearwardly disposed thereon, the inner-flange being provided with spaced notches, a channel-shaped bracing member disposed in and having the base portion thereof abutting the base of said longitudinal channel member and having the rearwardly disposed flanges thereon tangent to the inner edge of said notches, a box-like element having a base and a pair of perpendicular legs extending therefrom disposed in said longitudinal channel member between two of said spaced notches, with the perpendicular legs thereof extending toward the base portion of said channel-shaped bracing member, a plurality of transverse members received by said notches and extending rearwardly therein, a pair of resilient elements of L-shaped cross-section disposed in said longitudinal channel member in inverted relationship behind said transverse members and said box-like elements, and a retaining member secured to said longitudinal channel member behind said resilient elements for exerting a bias on said box-like members and said transverse members, whereby the perpendicular legs of said box-like elements are urged into contact with the base portion of said channel-shaped bracing member and said transverse members are urged toward the line of tangency between the flanges of said channel-shaped bracing members and the inner edge of said notches.

References Cited in the file of this patent

UNITED STATES PATENTS

| | | |
|---|---|---|
| 1,757,664 | Gohmann | May 6, 1930 |
| 2,006,755 | Whitlock | July 2, 1935 |
| 2,591,346 | Fitzgerald | Apr. 1, 1952 |